(12) United States Patent
Batawi et al.

(10) Patent No.: US 6,228,522 B1
(45) Date of Patent: May 8, 2001

(54) PEROWSKITE FOR A COATING OF INTERCONNECTORS

(75) Inventors: Emad Batawi, Winterthur; Alessio Plas, Zürich, both of (CH)

(73) Assignee: Sulzer Hexis AG, Winterthur (CH)

( * ) Notice: Subject to any disclaimer, the term of this patent is extended or adjusted under 35 U.S.C. 154(b) by 0 days.

(21) Appl. No.: 09/360,112

(22) Filed: Jul. 23, 1999

(30) Foreign Application Priority Data

Jul. 24, 1998 (EP) .................................................. 98810716

(51) Int. Cl.$^7$ .............................. H01M 8/10; H01M 2/02

(52) U.S. Cl. ................................. 429/34; 429/30; 429/33

(58) Field of Search .................... 429/30, 33, 34

(56) References Cited

U.S. PATENT DOCUMENTS

| | | | |
|---|---|---|---|
| 5,389,456 | * | 2/1995 | Singh et al. . |
| 5,391,440 | * | 2/1995 | Kuo et al. . |
| 5,411,767 | | 5/1995 | Soma . |
| 5,418,081 | * | 5/1995 | Kawasaki et al. . |
| 5,432,024 | * | 7/1995 | Soma et al. . |
| 5,445,903 | * | 8/1995 | Cable et al. . |
| 5,453,330 | * | 9/1995 | Kawasaki et al. . |
| 5,480,739 | * | 1/1996 | Kawasaki et al. . |
| 5,496,655 | * | 3/1996 | Lessing . |
| 5,741,605 | * | 4/1998 | Gillett et al. . |
| 5,770,326 | * | 6/1998 | Limaye . |
| 5,878,752 | * | 3/1999 | Adams et al. . |
| 5,932,368 | * | 8/1999 | Batawi et al. . |
| 5,964,991 | * | 10/1999 | Kawasaki et al. . |
| 6,054,231 | * | 4/2000 | Virkar et al. . |
| 6,085,413 | * | 7/2000 | Klassen et al. . |

FOREIGN PATENT DOCUMENTS

| | | |
|---|---|---|
| 19630991A1 | 2/1998 | (DE) . |
| 0338823A1 | 10/1989 | (EP) . |
| 0 714 417 A1 | 5/1996 | (EP) . |
| 0714147A1 | 5/1996 | (EP) . |
| 0722193A1 | 7/1996 | (EP) . |
| 0974564A1 | * 2/1999 | (EP) . |
| 02000053424A | * 2/2000 | (JP) . |

OTHER PUBLICATIONS

De Souza, R.A., "Oxygen transport in La1−xSrxMn1−yCoyO3±δ perovskits Part I. Oxygen tracer diffusion", *Solid State Ionics*, 106 (1998) 175–187.

Database Chemabs, Chemical Abstracts Service, Columbus, Ohio, US; Sunstrom, Joseph E., IV et al.: "The synthesis and properties of the chemically oxidized perovskite, La1−xSrxCoO3—.δ.(0.5 ltoreq.x.ltoreq. 0.9.)", XP002087836, Abstract & J. Solid State Chem. (1998), 139(2), 388–397 Coden: JSSCBI;ISSN: 0022–4596.

(List continued on next page.)

*Primary Examiner*—Clifford C. Shaw
*Assistant Examiner*—Colleen P. Cooke
(74) *Attorney, Agent, or Firm*—Townsend & Townsend & Crew LLP

(57) ABSTRACT

The Perowskite is provided for the coating of interconnectors (1) which are used in high temperature fuel cells. Its composition can be described by the formula $ABO_{3-\epsilon}$ with $A=(E_{1-w}\ Ln_{w-\delta})$ and $B=(G_{1-z}\ J_z)$. In this the following hold:

Figure 1:
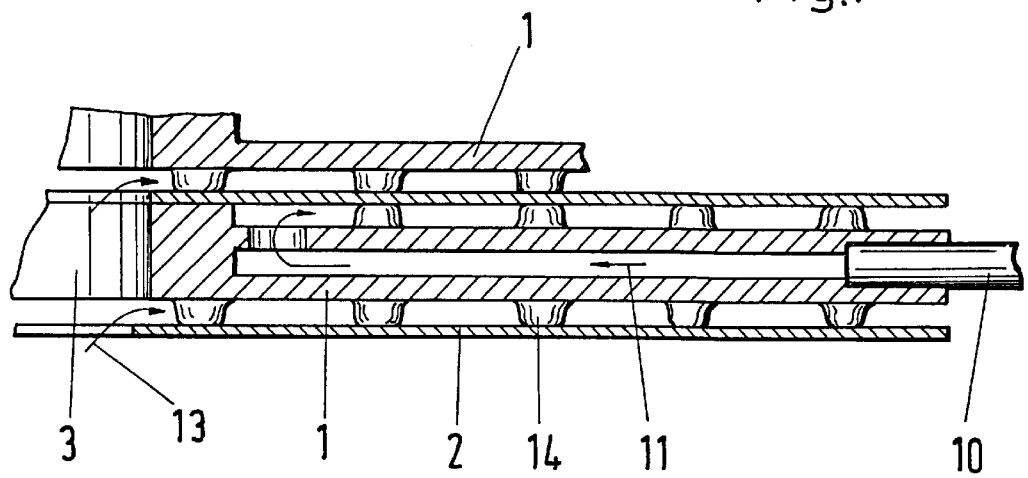

E is an alkaline earth metal, preferably Sr or Ca, Ln is a lanthanide, preferably La or Y, G is a transition metal, preferably Mn, J is a second transition metal, preferably Co, w is a number which is greater than 0.1 and less than 0.5, preferably equal to 0.2, δ is a positive or negative number, the absolute value of which is less than about 0.02, z is a number which is greater than 0.01 and less than 0.5, preferably equal to 0.2 and ε is a positive or negative number, the absolute value of which is less than about 0.5.

10 Claims, 2 Drawing Sheets

OTHER PUBLICATIONS

Database Chemabs, Chemical Abstracts Service, Columbus, Ohio, US; Kharton, V.V. et al.: "Development of mixed conductive materials for high–temperature electrochemical oxygen membranes", XP002087837, Abstract, & High Temp. Electrochem.: Ceram. Met., Proc. Risoe Int. Symp. Mater. Sci., $17^{th}$ (1996), 301–306. Editor(s) Poulsen, F.W. Publisher: Risoe National Laboratory, Roskilde, Den. Coden: 63PAA2.

Database Chemabs, Chemical Abstracts Service, Columbus, Ohio, US; Takeda, Y., et al.: "Cathodic polarization phenomena of perovskite oxide electrodes with stabilized zirconia" XP002087838, Abstract; & J. Electrochem. Soc. (1987), 134(11), 2656–61 Coden: Jesoan; ISSN: 0013–4651.

Patent Abstracts of Japan, vol. 013, No. 343 (E–796), Aug. 2, 1989 & JP 01 100866 A (Toa Nenryo Kogyo KK), Apr. 19, 1989. Abstract.

* cited by examiner

PEROWSKITE FOR A COATING OF INTERCONNECTORS

The invention relates to a Perowskite for the coating of interconnectors which are provided for use in high temperature fuel cells. It also refers to interconnectors and batteries of high temperature fuel cells.

Fuel cell batteries with cells which are arranged in the form of stacks contain connection elements which are inserted between electrochemically active plates, namely interconnectors through which the electrodes of adjacent cells are connected in an electrically conducting manner. Interconnectors of this kind must have coatings which are electrically conducting and are impermeable to chromium oxide. A coating with a known Perowskite, namely LSM, is thermally sprayed on to the surfaces of the interconnectors using a HVOF procedure (High Velocity Oxy-Fuel) up to thicknesses of 150 $\mu$m. At the high temperatures of about 900° C. which are required for the operation of high temperature fuel cells, cells with uncoated interconnectors age very rapidly so that they already no longer yield any usable electric power after 400 hours. Through the coating a chromium oxide discharge is reduced, through which the lifetime is increased up to at least 15000 hours. A degradation of the electrochemically active plates is reduced to less than 1% during an operation period of 1000 hours.

In the HVOF procedure the material to be coated, the mentioned Perowskite LSM, is sprayed on in the form of particles which are accelerated to high (supersonic) speeds, with their temperature being increased during the spraying on to a value which lies in the vicinity of the melting point of the LSM. An even higher temperature, as would be the case in a vacuum plasma spraying process, is avoided in order to be able largely to prevent a chemical segregation of the Perowskite. A segregation would worsen the properties of the coating with respect to the electrical conductivity and to the suppression of the chromium oxide transport. Layers can be manufactured with the HVOF procedure, the porosity of which is less than 25%. At the maximum value of the porosity a sufficient protection against a discharge of chromium oxide results when the layer is 150 $\mu$m thick.

In order that the Perowskite coating is largely homogeneous, the parameters of the HVOF procedure must be set in such a manner that no segregations take place. The energy which the powder particles pick up during the spraying should be kinetic energy to the greatest extent. The temperature and thus the heat energy should be as low as possible. With a large kinetic energy the length of time during which the powder particles are exposed to an increased temperature is less so that the extent of a segregation of the Perowskite is likewise less. Furthermore, the coating should be as impermeable as possible. The more impermeable it is, the greater is the electrical conductivity and the less the layer thickness can be chosen to be, both of which are advantageous with respect to an Ohmic resistance of the coating, which should be as low as possible.

Perowskites can be described by the formula $ABO_3$, with A and B signifying two components which are present in addition to oxygen O. For LSM the A component is $La_{0.8}Sr_{0.2}$ and the B component Mn. Lanthanides, in particular lanthanum La, are expensive materials, so that the LSM contributes in a clearly noticeable manner to the total costs of the fuel cell due to the La contained in it. In order to be able to offer fuel cells as a competitive current source, their manufacturing costs must be reduced massively. One is thus presented the problem of whether there are alternative materials which have the same functional properties as LSM with respect to an interconnector coating but which cost significantly less.

The object of the invention is to find a material for an economical coating of interconnectors which is largely equally as effective as LSM. This object is satisfied by the Perowskite $ABO_{3-\epsilon}$ which is characterised in claim 1, with in particular the A component comprising less than 50 atomic percent (w<0.5) of a lanthanide.

The Perowskite is provided for a coating in interconnectors which are used in high temperature fuel cells. Its composition can be described by the formula $ABO_{3-\epsilon}$ with $A=(E_{1-w}Ln_{w-\delta})$ and $B=(G_{1-z}J_z)$. In this the following hold: E is an alkaline earth metal, preferably Sr or Ca; Ln is a lanthanide, preferably La or Y; G is a transition metal, preferably Mn; J is a second transition metal, preferably Co; w is a number which is greater than 0.1 and less than 0.5, preferably equal to 0.2; $\delta$ is a positive or negative number, the absolute value of which is less than about 0.02; z is a number which is greater than 0.01 and less than 0.5, preferably equal to 0.2 and $\epsilon$ is a positive or negative number, the absolute value of which is less than about 0.5.

For the corresponding formula $ABO_{3-\epsilon}$ of LSM, the following holds for the comparison with the Perowskite in accordance with the invention: w=0.8, $\delta$=0, Ln=La, E=Sr, z=0, G=Mn and $\epsilon$=0.

Whereas in the known Perowskite LSM, segregation phenomena can only be avoided by means of the HVOF procedure, other thermal spraying procedures, for example plasma spraying, can also be used in the coatings with lanthanide-poor Perowskites. Since the tendency toward the formation of segregations is also reduced through the reduction of the lanthanide component.

Claim 2 relates to particularly advantageous Perowskites, which have been selected with respect to thermal expansion and electrical conductivity.

Claims 3 to 6 relate to interconnectors which are coated with Perowskites of the composition in accordance with the invention. The subject of claim 7 is a fuel cell battery with interconnectors of this kind. The present invention also provides fuel cell batteries with interconnectors wherein the interconnectors are arranged between electrochemically active plates of a cell stack, with electrodes of electrochemically active plates of adjacent cells in each case being connected in an electrically conducting manner by an interconnector and with their interconnector coating having a specific electrical resistance which amounts at most to 20 mOHm cm.

Figure 2:
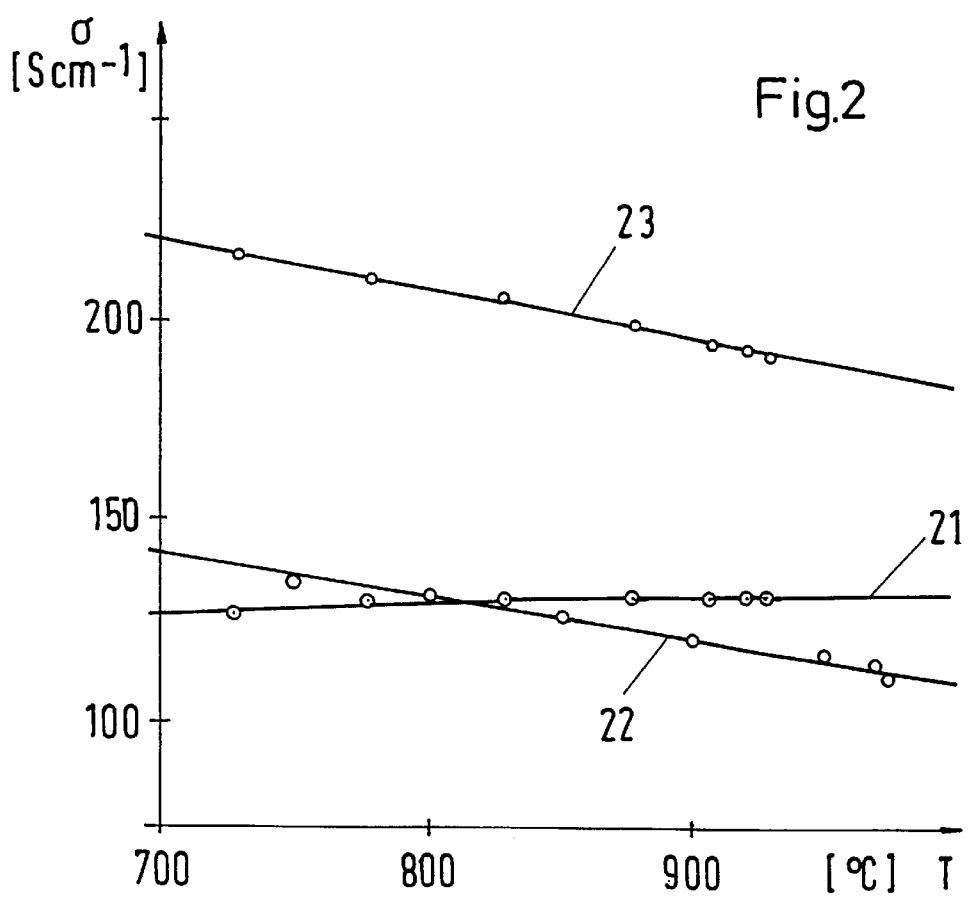
Figure 3:
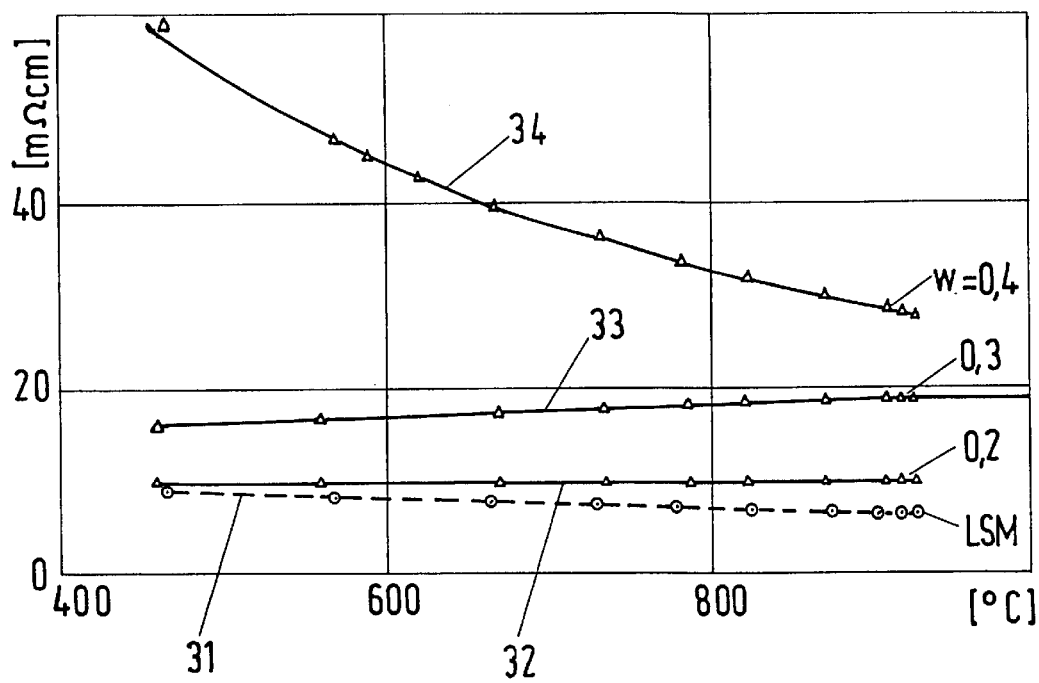
Figure 4:
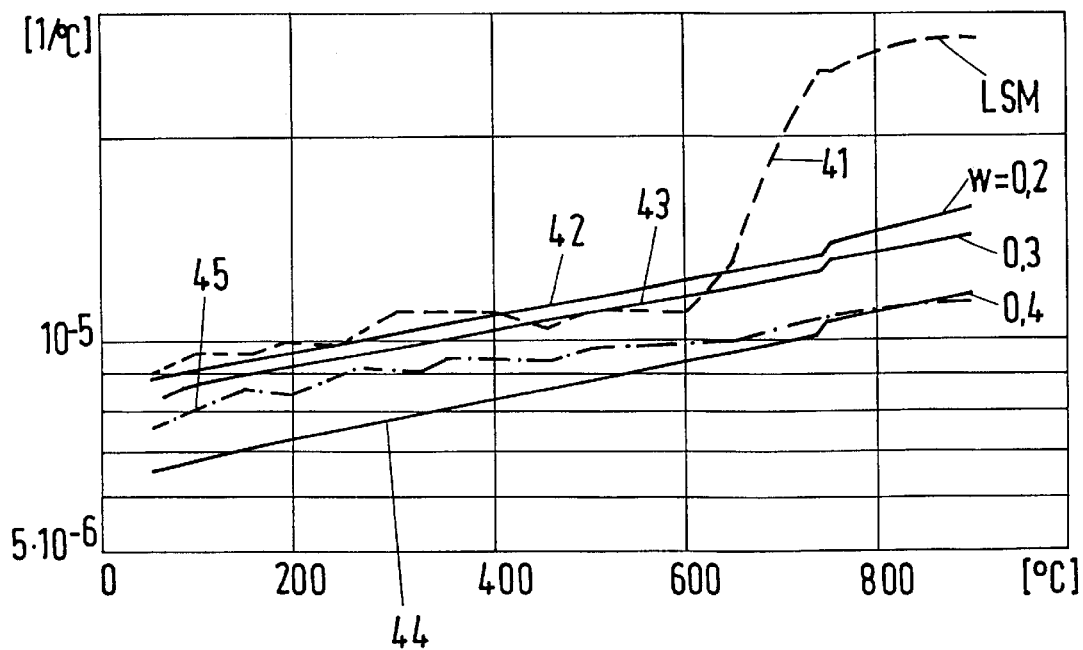

The invention will be explained in the following with reference to the drawings. Shown are:

FIG. 1 a cross-section through a fuel cell, half of which is illustrated,

FIG. 2 a diagram on the specific conductivity of Perowskites—two of which in accordance with the invention and one of which known—in dependence on the temperature, FIG. 3 a second diagram on specific resistances and FIG. 4 a third diagram on thermal expansion coefficients.

A centrally symmetric cell of a stack-shaped fuel cell battery such as is known for example from EP-A 0 714 147 (=P.6651) is illustrated in section in FIG. 1. In this publication the problems with respect to the chromium contained in the interconnectors is discussed in more detail.

The fuel cell comprises a connection element which is formed as a heat exchanger, an interconnector 1 in which air 11 which is supplied through a feed in tube 10 is preheated. Between the interconnectors 1 of adjacent cells there is arranged in each case an electrochemically active plate 2 which is built up—not illustrated—of an air electrode or cathode, a gas electrode or anode and a solid electrolyte. Conduction gas 13 is distributed into the individual cells via a central channel 3. Knob-shaped elevations 14 produce electrical connections from the interconnectors 1 to the electrodes.

The interconnectors 1 are manufactured of an alloy which consists mainly of chromium and which has a thermal expansion which is largely the same as that of the electrochemically active plate 2. The outer surface of the basic body of the interconnector, which is manufactured of this alloy, is coated with a Perowskite; the inner surface, which must also be coated, can be enamelled.

In the choice of a Perowskite it must be observed on the one hand that the latter has a thermal expansion which is similar to that of the alloy of the basic body in order that the coating adheres well to the basic body. On the other hand the specific conductivity of the coating must be as high as possible or, respectively, the specific resistance must be as low as possible in order that a good efficiency results for the fuel cell battery.

The diagrams of FIGS. 2 to 4 relate to these two parameters, which are important for the choice of the Perowskite. In FIG. 2 the specific conductivity of two new Perowskite coatings, measurement curves 22 and 23, can be compared with that of the known LSM coating, measurement curve 21. Curve 22 was measured for SLM (=$La_{0.2}Sr_{0.8}MnO_3$) and curve 23 for CLM (=$La_{0.2}Ca_{0.8}MnO_3$) as a function of the temperature T. The measured values are marked as dots. These values depend on a further parameter, the porosity, for which the following values have been determined: For CLM 1%, for LSM 3% and for SLM 40%. It is to be expected that through a reduction of the porosity of SLM a similarly good, i.e. high conductivity results as for CLM, which is even better than LSM.

As can be recognised with reference to FIG. 2 with respect to the conductivity, La can indeed be substituted successfully to a large extent by Sr or Ca. As further, non-illustrated measurements have yielded, the thermal expansion behaviour of this Perowskite is also similar to that of the basic body to be coated.

It is known that further constituents of Perowskite can also be substituted and varied without significant modifications of the chemical and physical properties resulting. Thus an entire class of Perowskites, which is defined by the formula given in claim 1, is useable for the coating of interconnectors. Perowskites of the formula $Ca_{1-w}Y_wMnO_3$, with $0.1<w<0.25$, have proved particularly advantageous: see in the following FIGS. 3 and 4. In these CYM Perowskites $Ca_{1-w}Y_wMnO_3$ the La of the LSM is completely substituted, namely to a great extent by the alkaline earth metal Ca and to a lesser extent by the lanthanide Y.

In FIG. 3 measurements of the specific resistances (unit: mOhm cm) of LSM, curve 31 which is drawn in a broken line, and of the CYM Perowskites, curves 32 to 34, with w=0.2, 0.3 and 0.4 respectively are illustrated. The porosities are different: for LSM (curve 31) 3% as well as for the CYM Perowskite 14% for w=0.2 (curve 32), 9% for w=0.3 (curve 33) and 5% for w=0.4 (curve 34). FIG. 4 shows the thermal expansion coefficients (unit 1/° C.) for the same Perowskites: the curve 41, which is drawn in a broken line, indicates the measured value plot for LSM and the curves 42 to 44 for the CYM Perowskites, with w=0.2, 0.3 and 0.4 respectively. The thermal expansion coefficient of the alloy of the interconnector basic body is additionally indicated with the chain dotted curve 45.

As can be derived from FIGS. 3 and 4 a value of w is to be chosen for the CYM Perowskites which tends to be small with respect to the electrical resistance and tends to be large with respect to the thermal expansion coefficient. One thus advantageously chooses a value which lies in the named interval $0.1<w<0.25$. In regard to the resistance there results a slight worsening in comparison with LSM. On the other hand, the CYM Perowskites are more suitable with respect to the thermal expansion behaviour since they do not display a phase transition as does LSM—see the steep rise of the curve 41 in the region of 700° C.

The Perowskites in accordance with the invention have a further advantage in comparison with LSM. Lanthanum in the form of $La_2O_3$ is hydrophilic. As a result of segregations LSM contains this oxide; it can therefore pick up water from the surroundings and in so doing form hydroxides, which can have the result that the coating separates from the basic body. In the alkaline earth metals Ca and Sr and the lanthanide Y, by which the La can be partly or completely be substituted, this problem does not arise.

This advantage is also important with respect to the choice of a coating procedure. Whereas the named HVOF procedure is to be used for LSM in order to largely avoid the formation of $La_2O_3$, other thermal spraying procedures, which are less complicated and expensive, now also come into consideration for the Perowskite in accordance with the invention in which the La is substituted.

An electrochemically active element is known from EP-A 0 722 193 (=P.6658) which is applied to a carrier plate with a cellular, open pored structure. The Perowskite in accordance with the invention can also be used for the manufacture of a carrier plate of this kind. It is also possible to manufacture the interconnectors entirely of the Perowskite in accordance with the invention. Since the interconnectors are formed as heat exchangers for the air which is fed into the fuel cells, however, the lower heat conducting ability of the Perowskite in comparison with the customarily used metals would be disadvantageous.

What is claimed is:

1. A perovskite for a coating of interconnectors which are used in high temperature fuel cells, said perovskite having the formula $$ABO_{3-\epsilon}$$

with A=($E_{1-w}Ln_{w-\epsilon}$) and B=($G_{1-z}J_z$) in which the following hold:

E is an alkaline earth metal,

Ln is a lanthanide,

G is a transition metal,

J is a second transition metal, w is a number which is greater than 0.1 and less than 0.5, δ is a positive or negative number, the absolute value of which is less than about 0.02, z is a number which is greater than or equal to 0.00 and less than 0.5, and ε is a positive or negative number, the absolute value of which is less than about 0.5.

2. The perovslite in accordance with claim 1, wherein, said perovskite has the formula $$Ca_{1-w}Y_wMnO_3$$

wherein $0.1<w<0.25$.

3. An interconnector for high temperature fuel cells, said interconnector having a coating of perovskite in accordance with claim 1, wherein said coating is sprayed onto the surfaces of the interconnectors in the form of a powder and using a HVOF procedure or another thermal spraying procedure, wherein during the spraying practically no chemical segregation arises in the perovskite.

4. The interconnector in accordance with claim 3, wherein said coating has a porosity of less than 40% and having a layer thickness of less than 0.2 mm.

5. The interconnector in accordance with claim 4, wherein said coating has a porosity of less than 10% and said layer thickness is less than 0.15 mm.

6. The interconnector in accordance with claim 5, wherein said thermal expansion coefficients of said perovskite of the coating and of the interconnector material are similar.

7. A fuel cell battery with interconnectors in accordance with claim 1, wherein said interconnectors are arranged between electrochemically active plates of a cell stack, with electrodes of electrochemically active plates of adjacent cells in each case being connected in an electrically conducting manner by an interconnector and with their interconnector coating having a specific electrical resistance which amounts at most to 20 mOhm cm.

8. The perovskite in accordance with claim 1, wherein

E is selected from group consisting of Sr and Ca;

Ln is selected from group consisting of La and Y;

G is Mn;

J is Co;

w is equal to 0.2; and z is equal to 0.2.

9. An interconnector for high temperature fuel cells, said interconnector having a coating of perovskite in accordance with claim 1, said interconnector being comprised of a chromium alloy.

10. The interconnector in accordance with claim 9, wherein said chromium alloy is about 25% chromium.

* * * * *

UNITED STATES PATENT AND TRADEMARK OFFICE
CERTIFICATE OF CORRECTION

PATENT NO.   : 6,228,522 B2
DATED         : May 8, 2001
INVENTOR(S)  : Batawi, Emad and Alessio Plas It is certified that error appears in the above-identified patent and that said Letters Patent is hereby corrected as shown below:

<u>Title page,</u>
Item [54], please correct the title by deleting "PEROWSKITE" and inserting therefor -- PEROVSKITE --.
Item [30], please correct the Foreign Application Priority Data, by adding -- 5 -- to the application number listed.
Item [56], References Cited, OTHER PUBLICATIONS, "DeSouza" reference delete "perovskits" and insert therefor -- perovskites --.

<u>Column 4,</u>
Line 46, delete the subscripted lowercase Greek letter epsilon "$_\epsilon$" and insert, subscripted, therefor the lower case Greek letter delta -- $\delta$ --.

Signed and Sealed this

Twenty-third Day of March, 2004

JON W. DUDAS
*Acting Director of the United States Patent and Trademark Office*